INVENTORS
MARION R. CALTON
BY RICHARD E. HAUTALA
ATTORNEYS

United States Patent Office 3,452,422
Patented July 1, 1969

3,452,422
METHOD AND APPARATUS FOR FRICTION BONDING MATERIALS HAVING DIFFERENT HIGH TEMPERATURE STRENGTH
Marion R. Calton, East Peoria, and Richard E. Hautala, Peoria, Ill., assignors to Caterpillar Tractor Co., Peoria, Ill., a corporation of California
Filed Apr. 6, 1966, Ser. No. 540,617
Int. Cl. B23k *31/02*
U.S. Cl. 29—470.3                 10 Claims

ABSTRACT OF THE DISCLOSURE

A method and apparatus for friction bonding a first workpiece to a second piece having a substantially lower high temperature strength than the first workpiece comprising a restraint sleeve encircling the lower strength part only and extending close enough to the interface to prevent excessive heating and plastic forging of the lower strength material prior to heating of the stronger material to a temperature suitable for bonding. In certain applications, and additional restraint sleeve is employed with the high strength part to permit the use of high axial pressures at the interface. The sleeves may be chambered for circulation of cooling fluid to extract heat from the workpieces during the welding process.

---

This application relates to a friction bonding process in which adjoining ends of the two parts to be joined are engaged in rotational rubbing contact under pressure until the interface is heated to a plastic condition and flash is squeezed from the interface. This application relates particularly to method and apparatus for controlling the flash when one part has a high temperature strength which is substantially greater than the high temperature strength of the other part.

If the difference in high temperature strength of the parts being joined is too great the lower strength part can be heated to the condition where there is plastic flow of the low strength part without the development of sufficient heat at the interface to produce adequate plastic flow of the high strength part. Under such circumstances there will be excessive upsetting of the low strength part without obtaining an adequate bond to the high strength part. The problem is particularly acute when one of the parts is composed of material having high strength at elevated temperatures so as to be inherently difficult to heat to a plastic condition. To avoid such problems of excessive flashing, it has been the practice to make the lower strength part of larger diameter. This often requires subsequent machining to remove the excess material and can be an undesirable technique for that reason.

It has also been proposed to use the jaws of one of the chucks of the bonding machine to restrain deformation of the lower strength part and also to provide some cooling effect. This technique also is of limited use. For example, it may not be possible to position the interface zone close enough to the chuck to permit the jaws of the chuck to act as an effective restraint.

It is a primary object of the present invention to constrict deformation of the lower strength part by a separate sleeve or ring. The sleeve or ring can be located as close to the interface as is necessary to limit the flashing of the lower strength part to whatever amount is desired. By using such a sleeve or ring, the flash of the lower strength part can in some cases be practically eliminated.

In most cases the ring or sleeve is preferably made of a metal which has substantial resistance to deformation and is a good heat conductor. A steel sleeve has proved quite satisfactory for many applications. The sleeve may also preferably abut the chuck at one end. The chuck then acts as a heat sink and also as a back-up for retaining the sleeve in position.

Cooling fluid may be circulated through the sleeve to increase the amount of heat which can be extracted from the low strength part.

Other and further objects of the present invention will be apparent from the following description and claims and are illustrated in the accompanying drawings which, by way of illustration, show a preferred embodiment of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 4:
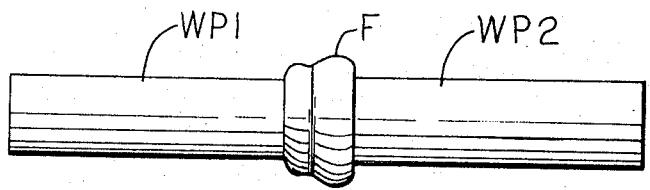
Figure 5:
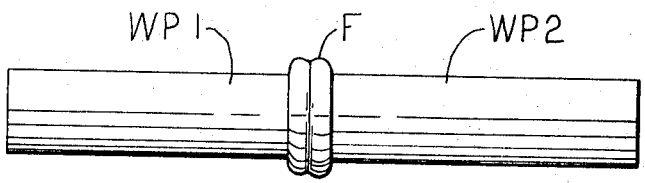
Figure 6:
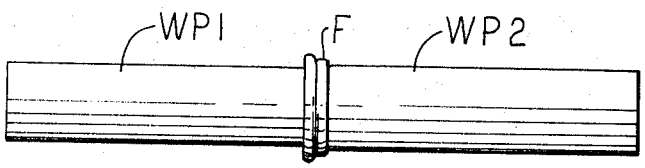

FIGS. 4, 5, and 6 are elevation views of an Inco 751 part bonded to an SAE 4140 part under similar process parameters. In FIG. 4 the parts were bonded without a restraint sleeve. In FIG. 5 the parts were bonded with a copper sleeve encircling the SAE 4140 piece and disposed about 3/16 inch back from the interface to produce substantially equal flash from each part. In FIG. 6 a sleeve encircled the SAE 4140 piece and was positioned within about 1/32 inch of the interface. This figure illustrates how the upset of the lower strength part can be limited to a negligible amount.

Figure 1:
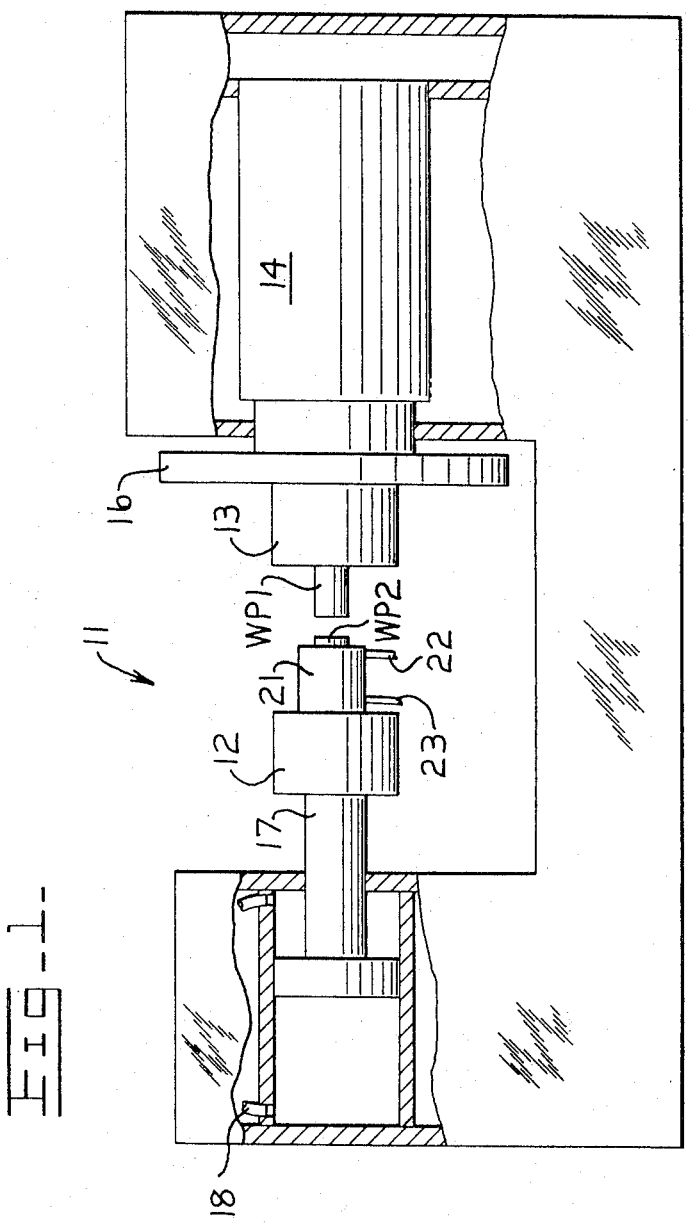
FIG. 1 is a side elevation view of a bonding machine which incorporates a cooling and restraint sleeve constructed in accordance with one embodiment of the present invention.

In FIG. 1 a machine constructed in accordance with one embodiment of the present invention is indicated generally by the reference numeral 11. The machine 11 includes two chucks 12 and 13 for holding two parts, or workpieces, WP1 and WP2, to be joined.

The chuck 13 and workpiece WP1 are rotatable by an electric motor 14, and a flywheel 16 is connected for rotation with the chuck 13. The flywheel 16 serves as an inertia weight to store the energy required for the bonding operation and also serves to control the process. The flywheel permits a large amount of energy to be put into the bond zone at high heating rates and thus helps to minimize overheating of the parts.

The chuck 12 secures workpiece WP2 and is mounted for axial movement by a ram 17. The pressure with which the parts WP1 and WP2 are engaged at their common interface is determined by the pressure of the fluid supplied through the line 18 to the head end of the ram.

In the operation of the machine 11 as thus far described, the part WP1 is rotated to a predetermined r.p.m. at which the desired amount of energy is stored in the flywheel 16. The power to the motor 14 is then cut off, or the flywheel 16 and chuck 13 can be disconnected from the motor 14, and the ram 17 is actuated to press the part WP2 in rubbing contact with the part WP1. The heating produced by such rotational rubbing contact causes the interface between the parts to become plastic. Flash is then squeezed out of the interface.

Figure 2:
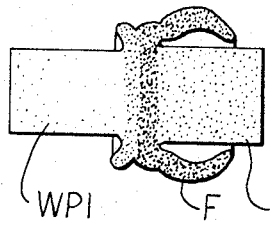
FIG. 2 is a cross-sectional view showing two parts having different high temperature strengths bonded by a process which does not use a restraint sleeve.

If the two parts being joined have substantially different high temperature strengths there may be excessive plastic flow, and the development of flash, by the low strength part before the high strength part is heated to a sufficient extent to produce adequate plastic flow or forging of the high strength material. This condition is illustrated in FIG. 2 where excessive flash F has been formed from the low strength part WP2. In the condition illustrated in FIG. 2 the bond at the interface is likely to be inadequate, and can contain a large amount of microvoids due to insufficient forging between the two parts.

In accordance with the present invention a separate cooling and restraint sleeve 21 encircles the low strength part WP2 in a snug-fit relation. One end of the restraint sleeve 21 is disposed quite close to the end of the part WP2. The other end of the sleeve 21 may preferably abut the chuck 12 so as to be retained in fixed position by the chuck.

When the parts WP1 and WP2 are engaged in rotating rubbing contact, the sleeve 21 acts to restrain deformation of the part WP2 and also extracts heat from the part. Higher axial pressures can be used at the interface, and the higher strength part can be heated to a higher temperature before enough heat is developed in the lower strength part to cause plastic flow. The combination of these two effects produces higher temperatures in the higher strength part and brings the higher strength part to these higher temperatures more quickly than would be possible without the restraint sleeve.

Figure 3:
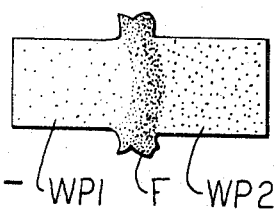
FIG. 3 is a view like FIG. 2 showing the same parts when bonded with a restraint sleeve encircling the lower strength part.

FIG. 3 illustrates the typical interface heat-affected zone pattern produced by the use of a restraint sleeve. In this case the parts produced substantially equal amounts of flash. This is considered desirable for machining purposes. As illustrated in FIG. 3 the central portions of the higher strength part project into the lower strength part in a generally dome-shaped or conical-shaped interface pattern. This pattern results from the use of the restraint sleeve and the higher axial pressure which can be used with the restraint sleeve.

For most materials the restraint sleeve 21 is preferably made of some material which has substantial resistance to deformation and is capable of conducting heat. Steel has been found quite satisfactory for most applications.

As illustrated in FIG. 1 cooling fluid can be circulated through the sleeve, by means of conduits 22 and 23, if it is necessary to extract more heat from the lower strength part. It is in some instances possible to make the sleeve 21 of a material which is a more efficient conductor of heat than steel. Copper has been found to be satisfactory for such applications.

The amount to which the flash is restricted is dependent upon the closeness of the restraint sleeve to the interface. This is illustrated in FIGS. 4 through 6. In FIG. 4 no restraint sleeve was used on the lower strength part WP2. In FIG. 5 a restraint sleeve was placed about 3/16 inch from the end of the lower strength part WP2. This position of the restraint sleeve produced substantially equal amounts of flash by the lower strength part WP2 and the higher strength part WP1. The most convincing illustration of the effect of the restraint sleeve is shown in FIG. 6. In this case the sleeve was about 1/32 inch from the end of the lower strength part WP2. In spite of the very small total flash produced in the specimen illustrated in FIG. 6, this specimen proved stronger in a bend test (3 point loading) than either of the specimens illustrated in FIGS. 4 or 5.

While a restraint sleeve has been illustrated as associated only with the lower strength parts, an additional restraint sleeve may also be used with the higher strength part. The additional restraint sleeve will permit the use of higher axial pressures at the interface, and in many cases this will create a higher quality of bond.

While we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A method of friction bonding one metal part to a second metal part having substantially lower high temperature strength and resistance to plastic flow than the first part, said method comprising, engaging aligned ends of the parts in rotational rubbing contact with sufficient pressure at the interface to heat the interface to a plastic condition, and restraining plastic flow of the lower strength part by means of a cooling and restraint sleeve encircling the lower strength part only and extending close enough to the interface to prevent excessive heating and plastic forging of the lower strength material in a direction generally parallel to the interface prior to heating of the stronger material to a temperature at which the stronger material will forge and permit the formation of a strong bond.

2. A method as defined in claim 1 wherein the first part is a material having high strength at elevated temperatures so as to be inherently difficult to heat to a plastic condition and a highly heat-conductive copper sleeve is disposed about the lower strength part.

3. A method as defined in claim 2 wherein the parts are substantially equal in diameter.

4. A method as defined in claim 1 wherein the rotational speeds and axial pressures are controlled to produce a generally dome-shaped weld interface with the central portions of the higher strength part projecting into the lower strength part.

5. A method as defined in claim 1 wherein the parts are bonded by the inertia process.

6. A method as defined in claim 1 wherein cooling fluid is circulated through the cooling and restraint sleeve to extract heat from the lower strength part.

7. A method as defined in claim 1 including restraining plastic flow of the higher strength part by means of an additional cooling and restraint sleeve encircling the higher strength part only to permit the use of higher axial pressures at the interface than would be possible without the restraint sleeves.

8. A machine for friction bonding one metal part to a second metal part having substantially lower high temperature strength and resistance to plastic flow than the first part, said machine comprising, first chuck means for holding one of the parts, second chuck means for holding the other of the parts, drive means for rotating aligned ends of the parts in rubbing contact under sufficient pressure at the interface to heat the interface to a plastic condition, and a separate cooling and restraint sleeve for arrangement between the chuck means to encircle the lower strength part only and extend close enough to the interface to prevent excessive heating and plastic forging of the lower strength part in a direction generally parallel to the interface prior to heating of the stronger material to a temperature at which the stronger material will forge and permit the formation of a strong bond.

9. A machine as defined in claim 8 wherein the sleeve is copper and abuts one of the chucks at one end so as to be fixed in position and to conduct a high amount of heat from the low strength part.

10. A machine as defined in claim 8 including an additional cooling and restraint sleeve for arrangement between the chuck means to encircle the higher strength part only and permit the use of higher axial pressures at the interface than would be possible without the restraint sleeves.

References Cited

UNITED STATES PATENTS

| | | | |
|---|---|---|---|
| 3,046,649 | 7/1962 | Brennan | 29—487 X |
| 3,234,643 | 2/1966 | Hollander | 29—487 X |
| 3,273,233 | 9/1966 | Oberle et al. | 29—497.5 X |

JOHN F. CAMPBELL, *Primary Examiner.*

D. REILEY, *Assistant Examiner.*

U.S. Cl. X.R.

29—487, 497.5; 228—2, 46